United States Patent
Erhart

(10) Patent No.: US 11,068,765 B2
(45) Date of Patent: Jul. 20, 2021

(54) BATTERY CELL TEMPERATURE MEASUREMENT WITH RFID TAGS

(71) Applicant: Samsung SDI Co., Ltd., Yongin-si (KR)

(72) Inventor: Michael Erhart, Seiersberg-Pirka (AT)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/539,882

(22) Filed: Aug. 13, 2019

(65) Prior Publication Data

US 2020/0065640 A1 Feb. 27, 2020

(30) Foreign Application Priority Data

Aug. 22, 2018 (EP) .................................... 18190195
Mar. 27, 2019 (KR) ........................ 10-2019-0035349

(51) Int. Cl.
*G06K 19/06* (2006.01)
*G06K 19/07* (2006.01)
*G06K 19/077* (2006.01)

(52) U.S. Cl.
CPC ... *G06K 19/0709* (2013.01); *G06K 19/07758* (2013.01)

(58) Field of Classification Search
CPC .......... G06K 19/0709; G06K 19/0717; G06K 19/07758
See application file for complete search history.

(56) References Cited

U.S. PATENT DOCUMENTS

| 9,209,501 B2 | 12/2015 | Farmer et al. |
| 2007/0008141 A1 | 1/2007 | Sweetland |
| 2009/0289768 A1* | 11/2009 | Tseng ................. G06K 19/0717 340/10.1 |

(Continued)

FOREIGN PATENT DOCUMENTS

WO   WO 2016/128160 A1   8/2016

OTHER PUBLICATIONS

Extended European Search Report for EP 18190195.0, dated Feb. 25, 2019, 8 pages.

(Continued)

*Primary Examiner* — Thien M Le
(74) *Attorney, Agent, or Firm* — Lewis Roca Rothgerber Christie LLP

(57) ABSTRACT

A battery module includes: a plurality of battery cells; a printed circuit board arranged within a short distance to the battery cells; a passive radio frequency identification tag; and a radio frequency receiver on the printed circuit board. The radio frequency identification tag is attached to at least one of the battery cells and is configured to measure a temperature of the at least one battery cell to which it is attached. The radio frequency identification tag is configured to harvest energy supplied by the radio frequency receiver and to wirelessly send temperature signals corresponding to the temperature of the at least one battery cell within an operating range limited to the short distance. The radio frequency receiver is configured to wirelessly supply energy to the radio frequency identification tag and to receive the temperature signal sent by the radio frequency identification tag.

19 Claims, 3 Drawing Sheets

(56) References Cited

U.S. PATENT DOCUMENTS

| | | | |
|---|---|---|---|
| 2012/0016258 A1* | 1/2012 | Webster | A61B 10/0012 |
| | | | 600/549 |
| 2013/0314094 A1 | 11/2013 | Farmer et al. | |
| 2013/0316198 A1* | 11/2013 | Bandhauer | H01M 10/613 |
| | | | 429/50 |
| 2015/0132614 A1* | 5/2015 | Elian | H01M 10/0525 |
| | | | 429/50 |
| 2017/0057372 A1* | 3/2017 | Loftus | G01R 31/396 |
| 2017/0210229 A1* | 7/2017 | Brochhaus | B60L 3/0046 |
| 2020/0136197 A1* | 4/2020 | Bossi | H01M 10/425 |

OTHER PUBLICATIONS

European Office action issued in corresponding EP Application No. 18 190 195.0, dated May 26, 2021, 4 pages.

\* cited by examiner

BATTERY CELL TEMPERATURE MEASUREMENT WITH RFID TAGS

CROSS-REFERENCE TO RELATED APPLICATION

This application claims priority to and the benefit of European Patent Application No. 18190195.0, filed in the European Patent Office on Aug. 22, 2018, and Korean Patent Application No. 10-2019-0035349, filed in the Korean Intellectual Property Office on Mar. 27, 2019, the entire content of both of which are incorporated herein by reference.

BACKGROUND

1. Field

Aspects of embodiments of the present invention relate to a battery module in which the temperature of the battery cells is measured by radio frequency identification (RFID) tags and to a method for measuring the temperature of the battery cells of a battery module by using RFID tags.

2. Related Art

A rechargeable (or secondary) battery differs from a primary battery in that it is designed to be repeatedly charged and discharged, while a primary battery is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction between the positive electrode, the negative electrode, and the electrolyte solution. The shape of the case, for example, cylindrical or rectangular, may be selected according to the battery's intended purpose.

Rechargeable batteries may be (or may include) a battery module including (or formed of) a plurality of battery submodules, and each of the battery submodules may include a plurality of battery cells coupled to each other in series and/or parallel to provide a high energy density to power, as an example, a hybrid vehicle. Such battery modules may be mechanically and electrically integrated, equipped with a thermal management system, and configured to communicate with each other and one or more electrical consumers to form a battery system.

Static control of battery power output and charging of the battery module may not be sufficient to meet the dynamic power demands of various electrical consumers connected to the battery system. Thus, steady or intermittent exchange of information between the battery system and the controllers of the electrical consumers may be used. This information may include the battery system's actual state of charge (SoC), potential electrical performance, charging ability, and internal resistance as well as actual or predicted power demands or surpluses of the consumers.

For monitoring, controlling, and/or setting of the aforementioned parameters, a battery system generally includes a battery management unit (BMU) and/or a battery management system (BMS). Such control units (e.g., controllers) may be integrated with the battery system and disposed within a common housing or may be part of a remote control unit that communicates with the battery system via a suitable communication bus. In both cases, the control unit may communicate with the electrical consumers via a suitable communication bus, such as a CAN or SPI interface.

The BMS/BMU may be configured to control the temperature of the battery module and/or of each of its battery submodules. Resistive negative temperature coefficient sensors (NTC sensors) may be attached to any of the battery cells of the battery module. The NTC sensors are generally connected to the BMS/BMU via cables and connectors, and the temperature is measured according to the resistance of a temperature-dependent resistor in the NTC sensors.

Connecting each of the NTC sensors to the BMS/BMU via cables and connectors is generally performed in a manual production process that is time-consuming and cost-intensive.

BRIEF SUMMARY

There is a need for a method of temperature measurement of battery cells within a battery module and a corresponding assembly method of such a battery module that provides reduced productions costs and production time with regard to the implementation of a temperature measurement sensor into the battery module.

Aspects of embodiments of the present invention overcome or mitigate the above-identified drawbacks of the prior art and provide a battery module that can be produced at lower cost and within a shorter time frame as compared with the prior art example. Additional aspects of embodiments of the present invention provide a method of measuring the temperature of the battery cells in the battery module. Moreover, aspects of embodiments of the present invention provide a battery module and a method for operating the battery module that are energy-saving and tap-proof or at least reduce the possibilities of tapping.

One or more of the drawbacks of the prior art may be avoided or at least mitigated according to embodiments of the present invention as described herein and as defined by the appended claims and their equivalents.

A first embodiment of the present invention is related to a battery module including a plurality of battery cells, one or more radio frequency identification (RFID) tag(s), one or more radio frequency receiver(s), and a printed circuit board (PCB). The PCB may include the radio frequency receiver (e.g., the radio frequency receiver may be formed on or mounted to the PCB). Each of the RFID tags is attached to one or more of the battery cells and is configured to measure a temperature of the battery cell(s) to which it is attached. Further, the RFID tags may be passive RFID tags configured to harvest (e.g., operate or run on) energy supplied by the radio frequency receiver(s) and to wirelessly send temperature signals within an operating range. The operating range may be a short distance D (e.g., a short predetermined distance D). The temperature signals correspond to the temperature of the battery cell measured by the RFID tag that is attached to the battery cell. The radio frequency receiver(s) is configured to wirelessly supply energy to the RFID tag(s) and to receive a temperature signal sent by the RFID tag(s). The PCB is positioned close (or near) to the battery cells such that any of (e.g., all of) the RFID tags are located within the short distance D to at least one of the radio frequency receivers.

According to an aspect of the above-described battery module, no cables and/or connectors are required to connect temperature sensors within the battery module. Thus, costs for manually connecting cables and/or connectors may be avoided. A further aspect of the above-described battery module is that, due to the short distance between a sending RFID tag and a corresponding radio frequency receiver, the energy consumption may be drastically reduced by reducing the transmitting power and, correspondingly reducing the operating range of the RFID tag. Also, due to the short distance between a sending RFID tag and a corresponding radio frequency receiver and the reduced operating range of the RFID tag, safety from interception (e.g., safety from the signals being intercepted) is reduced.

The power of the electromagnetic field of a sender—such as an RFID tag—decreases with the distance from the sender (e.g., decreases as the distance from the sender increases). A distance from the sender at which the power of the electromagnetic field generated by the sender has decreased to a certain percentage, for example 10%, of the power of the electromagnetic field at the sender may be determined (e.g., may be calculated).

The operating range of passive RFID tags depends on the power that can be harvested by the RFID tags from the energy supply (e.g., the electromagnetic field) generated by the radio frequency receivers. The power that can be harvested by the RFID tags depends, in turn, on the power of the electromagnetic field at the position of the radio frequency receivers and the distance between the radio frequency receivers and the RFID tags. Thus, providing the short distance D that should act as limit for the operating range of an RFID tag includes choosing the power (e.g., the output power) and the distance between the radio frequency receivers supplying energy to the RFID tag and the RFID tag such that the operating range of the RFID tag is limited to a radius of D around the RFID tag.

In one embodiment of the battery module according to the present invention, the number of RFID tags is equal to the number of radio frequency receivers, and the radio frequency receivers are positioned such that any one of (e.g., all of) the RFID tags is located within the short distance D to one and only one of the radio frequency receivers.

According to some embodiments of the present invention, the short distance D is about 10 cm, in some embodiments about 5 cm, in some embodiments about 3 cm, and in some embodiments within a range of about 0.5 cm to about 2 cm.

In some embodiments, the battery module further includes a battery management system or is connectable to a battery management system, and the radio frequency receivers are each configured to pass a temperature signal received from a RFID tag or a signal based on the temperature signal received from a RFID tag along with a unique identification of the respective RFID tag to the battery management system.

The battery module, according to an embodiment of the present invention, may further include a housing that accommodates (e.g., encompasses) the battery cells, the radio frequency identification (RFID) tag(s), the radio frequency receiver(s), and the printed circuit board (PCB). The housing may be dimensioned such that the operating ranges of the RFID tags are limited to be within the housing. This further increases the safety from interception (or interference). The housing may include (or may be made of) metal. For example, the housing may include a metal layer, a metal grid, or metal stripes on its inner and/or outer surface to prevent (or substantially reduce) any wireless signals from leaving the housing (e.g., from leaving the space encompassed by the housing).

According to one embodiment of the battery module, the printed circuit board may include a balancing chip, and the radio frequency receiver(s) may be provided on the balancing chip. Due to this integration of electronic components, production costs and production time may be further reduced.

In one embodiment of the battery module according to the present invention, the radio frequency identification tag(s) may be formed as a label.

In one embodiment of the battery module according to the present invention, the radio frequency identification tag(s) may be glued onto the battery cell to which it is attached. This further simplifies the production process.

In one embodiment of the battery module according to the present invention, the RFID tag may be configured to measure the temperature of the battery cell to which it is attached. Also, the RFID tag may be configured to send a temperature signal based on (e.g., according to or corresponding to) a measured temperature of the battery cell to which it is attached.

The RFID tag(s) may be configured to measure a temperature of the battery cell to which it is attached by using a diode that is integrated into the RFID tag.

In one embodiment of the battery module according to the present invention, the RFID tag(s) may be configured to measure a temperature of the battery cell to which it is attached by using a temperature sensor connected to or integrated into the RFID tag.

Another embodiment of the present invention relates to a method for measuring the temperature of battery cells of a battery module. The battery module includes a plurality of battery cells, one or more RFID tag(s), one or more radio frequency receiver(s), and a printed circuit board (PCB). The PCB includes the radio frequency receivers (e.g., the radio frequency receivers are integrated with or are formed or installed on the PCB). Further, each of the RFID tags is attached to one or more battery cells, and the radio frequency receiver(s) is positioned such that any of (e.g., each of or all of) the RFID tags is located within a short distance D to one and only one of the radio frequency receivers. The method includes: wirelessly supplying energy via an electromagnetic field by the radio frequency receiver; wirelessly harvesting energy from the electromagnetic field by the radio frequency identification tags; measuring, by each of the radio frequency identification tags, the temperature of the battery cell to which it is respectively attached; wirelessly sending, by each of the radio frequency identification tags, a temperature signal within an operating range of the radio frequency identification tag, which is limited to the short distance D; receiving, by each of the radio frequency receivers, the temperature signal(s) sent by the radio frequency identification tags, in the operation range where the radio frequency receivers are arranged.

According to one embodiment, the short distance D may be about 10 cm, about 5 cm, about 3 cm, and/or within a range of about 0.5 cm to about 2 cm.

Further aspects of the present invention will be learned from the dependent claims and the following description.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Figure 1:
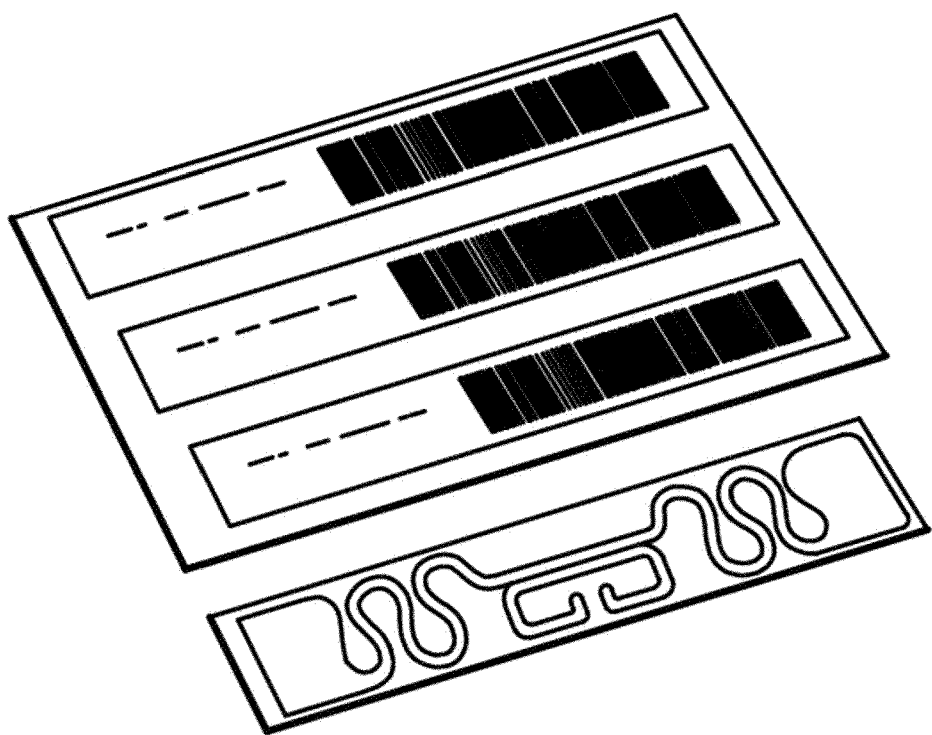
FIG. 1 shows radio frequency identification (RFID) tags.

Reference will now be made, in detail, to embodiments, examples of which are illustrated in the accompanying drawings. Aspects and features of the exemplary embodiments, and implementation methods thereof, will be described with reference to the accompanying drawings. In the drawings, like reference numerals denote like elements, and redundant descriptions thereof may be omitted. Further, in the drawings, the relative sizes of elements, layers, and regions may be exaggerated for clarity.

The present invention may be embodied in various different forms and should not be construed as being limited to the illustrated embodiments. Further, processes, elements, and techniques that are not considered necessary for those having ordinary skill in the art to have a complete understanding of the aspects and features of the present invention may be omitted for clarity.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

As used herein, the terms "substantially," "about," and similar terms are used as terms of approximation and not as terms of degree and are intended to account for the inherent deviations in measured and/or calculated values that would be recognized by those of ordinary skill in the art. Further, when the term "substantially" is used in combination with a feature that could be expressed by using a numeric value, the term "substantially" denotes a range of +/−5%.

FIG. 1 shows commercially available radio-frequency identification (RFID) tags in the form of labels. A radio-frequency identification (RFID) system uses tags or labels attached to the objects to be identified. Two-way radio transmitter-receivers, called interrogators or readers (throughout this specification and the claims also referred to as "radio frequency receivers"), send a signal to the tag and read (e.g., receive and interpret) its response. RFID uses electromagnetic fields to automatically identify and track tags attached to objects. The tags include electronically-stored information.

RFID tags can be either passive, active, or battery-assisted passive. An active tag has an on-board battery and periodically transmits its ID signal. A battery-assisted passive (BAP) tag has a small battery on board and is activated when in the presence of an RFID reader. A passive tag is cheaper and smaller because it has no battery; instead, the passive tag uses (e.g., operates by using) the radio energy transmitted by the reader. However, a passive tag must be illuminated with (e.g., must receive) a power level roughly a thousand times stronger than it outputs for signal transmission to operate. That makes a difference in interference and in exposure to radiation.

Tags may either be read-only, having a factory-assigned serial number that is used as a key with a database, or may be read/write, in which object-specific data can be written into the tag by the system user. Field programmable tags may be write-once, read-multiple, and "blank" tags may be written with an electronic product code by the user.

Passive tags collect energy from a nearby RFID reader's interrogating radio waves. Active tags have a local power source, such as a battery, and may operate hundreds of meters away from the RFID reader (e.g., may transmit a signal hundreds of meters to a RFID reader). Different from a barcode, the tag need not be within the line of sight of the reader, so it may be embedded in a tracked object. RFID is one method for Automatic Identification and Data Capture (AIDC).

RFID tags are used in many industries, for example, an RFID tag attached to an automobile during production may be used to track its progress through the assembly line, RFID-tagged pharmaceuticals may be tracked through warehouses, and RFID microchips may be implanted in livestock and pets to allow for positive identification of animals.

RFID tags contain three or more parts: an integrated circuit that stores and processes information and that modulates and demodulates radio-frequency (RF) signals; a device for (e.g., a means of) collecting DC power from the incident reader signal; and an antenna for receiving and transmitting the signal. The tag information is stored in a non-volatile memory. The RFID tag (e.g., the integrated circuit) includes either fixed or programmable logic for processing the transmission and sensor data. The device for collecting DC power may include a rectifier or a detection diode for extracting a DC voltage from the received RF signal.

An RFID reader transmits an encoded radio signal to interrogate the RFID tag. The RFID tag receives the message (e.g., the encoded radio signal) and then responds with its identification and other information.

Figure 2:
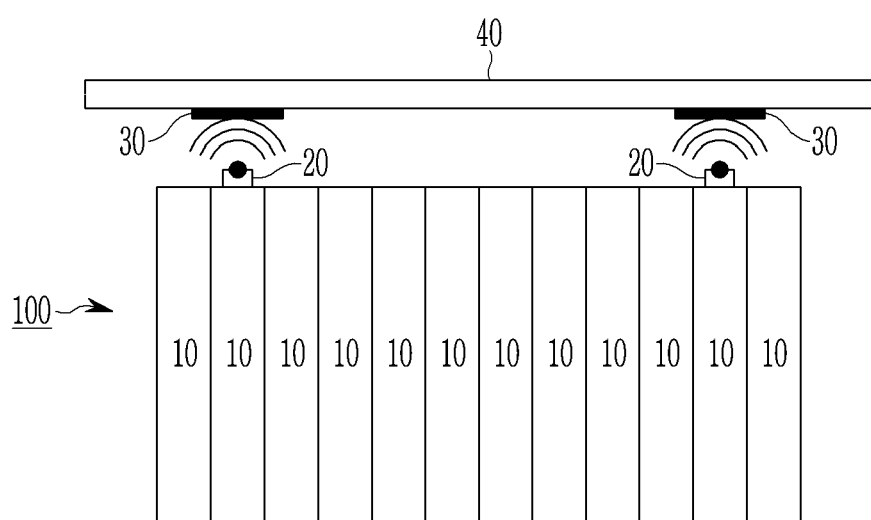
FIG. 2 is a schematic cross-sectional view of a battery module according to an embodiment of the present invention.

FIG. 2 is a schematic cross-sectional view of a battery module 100 according to an embodiment of the present invention. The battery module 100 may include a plurality of battery cells 10, for example, twelve battery cells 10. Each of the battery cells 10 may provide a voltage of approximately 4 V. When the battery module 100 includes twelve battery cells 10, the battery cells 10 may be coupled to each other in series such that a total voltage of 48 V is provided between first and last battery cells 10 (e.g., between the outermost battery cells 10). The twelve battery cells 10 may form one of a number of submodules of battery module 100, and the submodules may be coupled to each other in parallel. In an example in which the battery module 100 includes a plurality of submodules, FIG. 2 illustrates a cross-sectional view through only one of the submodules.

In the embodiment shown in FIG. 2, an RFID tag 20 is attached to a plurality of (e.g., two) of the twelve battery cells 10. The RFID tags 20 are passive RFID tags. The RFID tags 20 each have the form of a label as shown, by way of example, in FIG. 1, and are glued onto the battery cells 10 to which the RFID tags 20 are attached.

A printed circuit board (PCB) 40 is arranged above (e.g., directly above) the battery cells 10. A plurality of (e.g., two) radio frequency receivers 30 are mounted on or are integrated into a lower side of the PCB 40 such that, for each of the two RFID tags 20, one radio frequency receiver 30 is positioned directly opposite to (e.g., facing) the corresponding RFID tag 20. Here, the terms "above," "lower," "opposite," "left," "right," and the like refer to the assembly and orientation of the battery module 100 as depicted in FIG. 2, and these spatially relative terms are intended to encompass different orientations of the battery module 100 in use or operation in addition to the orientation depicted in FIG. 2. For each of the RFID tags 20, the distance between the RFID tag 20 and the opposite (e.g., corresponding) radio frequency receiver 30 is rather short, for example, about 1 cm.

The energy—or, correspondingly, the power (e.g., energy per time unit)—that is supplied by the each of the radio frequency receivers 30 is chosen (e.g., is set or is determined) such that the operating range of each of the RFID tags 20 is sufficient to reach the corresponding radio frequency receiver 30. For example, the operating range of each of the RFID tags 20 may be approximately 1 cm.

Each RFID tag 20 is configured to measure the temperature of the battery cell 10 to which it is attached (e.g., is glued onto) by using a diode integrated into the RFID tag 20 and is configured to send a signal corresponding to the measured temperature (e.g., a temperature signal). The temperature signal sent by (e.g., transmitted by) the RFID tag 20 shown on the left in FIG. 2 is received by the radio frequency receiver 30 shown on the left in FIG. 2 and vice versa (e.g., the temperature signal sent by each of the RFID tags 20 is received by the radio frequency receiver 30 facing or nearest to the corresponding RFID tag 20). The temperature signals received by the radio frequency receivers 30 may then be evaluated on the PCB 40 (e.g., evaluated by an integrated circuit or other processor on the PCB 40) or may be passed (e.g., directly passed) to a BMS/BMU that is connected to the PCB 40 or is arranged on the PCB 40. In some embodiments, the radio frequency receivers 30 may be part of a balancing chip that is integrated into the PCB 40.

Figure 3:
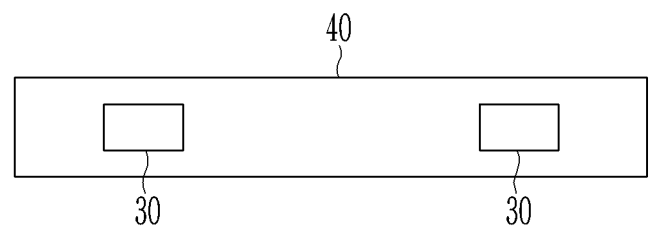
FIG. 3 is a schematic view of a printed circuit board (PCB) viewed from the position of the battery cells of the battery module shown in FIG. 2.

FIG. 3 is a schematic view of the PCB 40 of the battery module 100 shown in FIG. 2, viewed from the position of the battery cells 10. In the illustrated embodiment, two radio frequency receivers 30 are arranged on are or integrated into the PCB 40, but the present invention is not limited to two RFID tags 20 and two radio frequency receivers 30. The battery module 100 may include any suitable number of RFID tags 20 and radio frequency receivers 30 (e.g., the same number of RFID tags 20 and radio frequency receivers 30). The positions of the radio frequency receivers 30 on the PCB 40 are chosen such that they are located opposite to (e.g., directly opposite to or directly facing) corresponding RFID tags 20 when the PCB 40 is mounted or arranged in the battery module 100 as shown in, for example, FIG. 2.

A person of skill in the art should recognize that the functionality of various computing devices may be combined or integrated into a single computing device, or the functionality of a one computing device may be distributed across one or more other computing devices without departing from the scope of the present invention as defined by the claims and their equivalents.

SOME REFERENCE SIGNS 10 battery cell(s)
20 radio frequency identification (RFID) tag(s)
30 radio frequency receiver(s)
40 printed circuit board (PCB)
100 battery module

What is claimed is:
1. A battery module comprising:
a plurality of battery cells;
a printed circuit board;
a radio frequency identification tag; and
a radio frequency receiver on the printed circuit board,
wherein the radio frequency identification tag is attached to at least one of the battery cells and is configured to measure a temperature of the at least one battery cell to which it is attached,
wherein the radio frequency identification tag is a passive radio frequency identification tag configured to harvest energy supplied by the radio frequency receiver and to wirelessly send temperature signals within an operating range limited to a short distance, the temperature signals corresponding to the temperature of the at least one battery cell measured by the radio frequency identification tag that is attached thereto, wherein the radio frequency receiver is configured to wirelessly supply energy to the radio frequency identification tag and to receive the temperature signal sent by the radio frequency identification tag, and wherein the printed circuit board is arranged near the battery cells such that the radio frequency identification tag is located within the short distance to the radio frequency receiver.

2. The battery module according to claim 1, wherein a number of the radio frequency identification tags is equal to a number of the radio frequency receivers, and wherein the radio frequency receivers are positioned such that all of the radio frequency identification tags are located within the short distance to at least one of the radio frequency receivers.

3. The battery module according to claim 1, wherein the short distance is 10 cm.

4. The battery module according to claim 1, wherein the short distance is 5 cm.

5. The battery module according to claim 1, wherein the short distance is 3 cm.

6. The battery module according to claim 1, wherein the short distance is within a range of 0.5 cm to 2 cm.

7. The battery module according to claim 1, wherein the battery module further comprises a battery management system or is connectable to a battery management system, and wherein the radio frequency receiver is configured to pass the temperature signal received from the radio frequency identification tag or a signal based on the temperature signal received from the radio frequency identification tag along with a unique identification of the radio frequency identification tag to the battery management system.

8. The battery module according to claim 1, further comprising a housing accommodating the battery cells, the radio frequency identification tag, the radio frequency receiver, and the printed circuit board.

9. The battery module according to claim 1, further comprising a balancing chip on the printed circuit board, wherein the radio frequency receiver is integrated with the balancing chip.

10. The battery module according to claim 1, wherein the radio frequency identification tag is formed as a label.

11. The battery module according to claim 10, wherein the radio frequency identification tag is glued onto the at least one battery cell to which it is attached.

12. The battery module according to claim 1, wherein the radio frequency identification tag is configured to measure the temperature of the at least one battery cell to which it is attached, and wherein the radio frequency identification tag is configured to send the temperature signal based on a measured temperature of the at least one battery cell to which it is attached.

13. The battery module according to claim 12, wherein the radio frequency identification tag is configured to measure the temperature of the at least one battery cell to which it is attached by using a diode integrated into the radio frequency identification tag.

14. The battery module according to claim 1, wherein the radio frequency identification tag is configured to measure the temperature of the at least one battery cell to which it is attached by using of a temperature sensor connected to or integrated into the radio frequency identification tag.

15. A method for measuring a temperature of a battery cell of a battery module, the battery module comprising a plurality of battery cells, a radio frequency identification tag, a printed circuit board, and a radio frequency receiver on the printed circuit board, the radio frequency identification tags being attached to at least one of the battery cells, the radio frequency receiver being arranged such that the radio frequency identification tag is located within a short distance to the radio frequency receiver, the method comprising:

wirelessly supplying energy via an electromagnetic field by the radio frequency receiver;

wirelessly harvesting energy from the electromagnetic field by the radio frequency identification tag;

measuring, by the radio frequency identification tag, a temperature of the at least one battery cell to which it is attached;

wirelessly sending, by the radio frequency identification tag, a temperature signal within an operating range of the radio frequency identification tag that is limited to the short distance; and receiving, by the radio frequency receiver, the temperature signal sent by the radio frequency identification tag, in the operation range within which the radio frequency receiver is arranged.

16. The method according to claim 15, wherein the short distance is 10 cm.

17. The method according to claim 15, wherein the short distance is 5 cm.

18. The method according to claim 15, wherein the short distance is 3 cm.

19. The method according to claim 15, wherein the short distance is within a range of 0.5 cm to 2 cm.

* * * * *